(12) United States Patent
Lin et al.

(10) Patent No.: US 8,579,477 B2
(45) Date of Patent: Nov. 12, 2013

(54) ELECTRONIC DEVICE

(75) Inventors: Chun-Chi Lin, Taipei (TW);
Liang-Chieh Tseng, Taipei (TW);
Chun-Wen Wang, Taipei (TW)

(73) Assignee: Inventec Corporation, Taipei (TW)

( * ) Notice: Subject to any disclaimer, the term of this patent is extended or adjusted under 35 U.S.C. 154(b) by 296 days.

(21) Appl. No.: 13/167,715

(22) Filed: Jun. 24, 2011

(65) Prior Publication Data
US 2012/0170279 A1 Jul. 5, 2012

(30) Foreign Application Priority Data
Jan. 5, 2011 (TW) .............................. 100100380 A

(51) Int. Cl.
*F21V 19/00* (2006.01)
(52) U.S. Cl.
USPC ................. 362/382; 362/86; 362/87; 362/88; 362/383
(58) Field of Classification Search
USPC ..................................... 362/86–88, 382, 383
See application file for complete search history.

(56) References Cited

U.S. PATENT DOCUMENTS

| 2,150,210 | A | * | 3/1939 | Dreyfus | ..................... 455/157.1 |
| 5,426,474 | A | * | 6/1995 | Rubtsov et al. | ............... 362/556 |
| 2010/0316247 | A1 | * | 12/2010 | Ding | .............................. 381/397 |
| 2011/0188247 | A1 | * | 8/2011 | Huang et al. | ............. 362/249.02 |

FOREIGN PATENT DOCUMENTS

| JP | 2008-257259 A | 10/2008 |
| JP | 2010-039224 | 2/2010 |
| TW | 390406 U | 5/2000 |
| TW | M325578 | 1/2008 |
| TW | M334034 | 6/2008 |
| TW | M389485 | 10/2010 |
| TW | 201039293 A | 11/2010 |

* cited by examiner

*Primary Examiner* — William Carter
(74) *Attorney, Agent, or Firm* — CKC & Partners Co., Ltd.

(57) ABSTRACT

An electronic device is provided. The electronic device includes a body, a light source, a light shutter, and a light transmissive net structure. The body has a cavity therein. The light source is disposed in the cavity. The light shutter is disposed over the light source, wherein the light shutter includes a light transmissive pattern therein. The light transmissive net structure is disposed over the cavity and covers the light shutter. In use, light emitted from the light source would pass through the light transmissive pattern to the light transmissive net structure, thereby displaying an image corresponding to the light transmissive pattern onto the light transmissive net structure.

4 Claims, 5 Drawing Sheets

ELECTRONIC DEVICE

RELATED APPLICATIONS

This application claims priority to Taiwan Application Serial Number 100100380, filed Jan. 5, 2011, which is herein incorporated by reference.

BACKGROUND

1. Technical Field

The present invention relates to an electronic device.

2. Description of Related Art

Conventional speaker nets are usually disposed over speaker modules for notebooks, and indicator lights are generally disposed on a notebook body near a speaker net, such as a power indicator light, an alarm indicator light, or a "caps lock" indicator light.

The Indicator lights may include light sources and light guide plates disposed in a body, and patterns printed on the body, wherein light-emitting surfaces of the light guide plates and the patterns printed on the body are arranged symmetrically (e.g. up and down or left and right) so as to show some notebook statuses for users. In addition, manufacturers may form a light-emitting surface combined with a corresponding transmissive pattern to dispose on the body, therefore the transmissive pattern would be illuminated directly by a corresponding light source disposed in the body capable of showing some notebook statuses for users.

However, when all indicator lights are turned off on a conventional notebook body, users still can see light-emitting surfaces of light guide plates and patterns printed on the body clearly. Such arrangement provides users with a more complex appearance of the body, so that manufacturers cannot provide the notebook body with concise style for users. Furthermore, in conventional designs, when one of indicator lights is illuminated, users still can see other non-illuminated light-emitting surfaces or patterns next to the illuminated indicator light. Namely, these non-illuminated light-emitting surfaces or patterns would disturb users so as to make a wrong judgment easily.

In addition, each conventional indicator light needs one light guide plate disposed in a body respectively, so that speaker nets and indicator lights have to be produced and assembled respectively. Therefore the cost of manufacturing indicator lights would be increased.

SUMMARY

In an embodiment of the present invention, an electronic device including a body, a light source, a light shutter, and a light transmissive net structure is provided. The body includes a cavity therein. The light source is disposed in the cavity. The light shutter is disposed over the light source, wherein the light shutter includes a light transmissive pattern therein. The light transmissive net structure is disposed over the cavity and covers the light shutter. When the light source is turned on, light emitted from the light source would pass through the light transmissive pattern to the light transmissive net structure, thereby displaying an image corresponding to the light transmissive pattern onto the light transmissive net structure.

In the embodiment mentioned above, the light transmissive net structure covers the light shutter when the light source is turned off, thereby users cannot see the light transmissive pattern from outside of the light transmissive net structure but only see the light transmissive net structure. Such arrangement provides an appearance with concise style for users. Furthermore, when the light source is turned on, users can only see an image corresponding to the light transmissive pattern over the light source displayed on the light transmissive net structure. However, other light transmissive patterns corresponding to non-illuminated light sources would not be displayed on the light transmissive net structure. As such, users would not suffer visual disturbance from other non-illuminated patterns, thereby judging the meaning of the pattern displayed on the light transmissive net structure more correctly and easily. In addition, such arrangement do not need light guide plates disposed over light sources so as to decrease the cost of materials and assembly of light guide plates.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
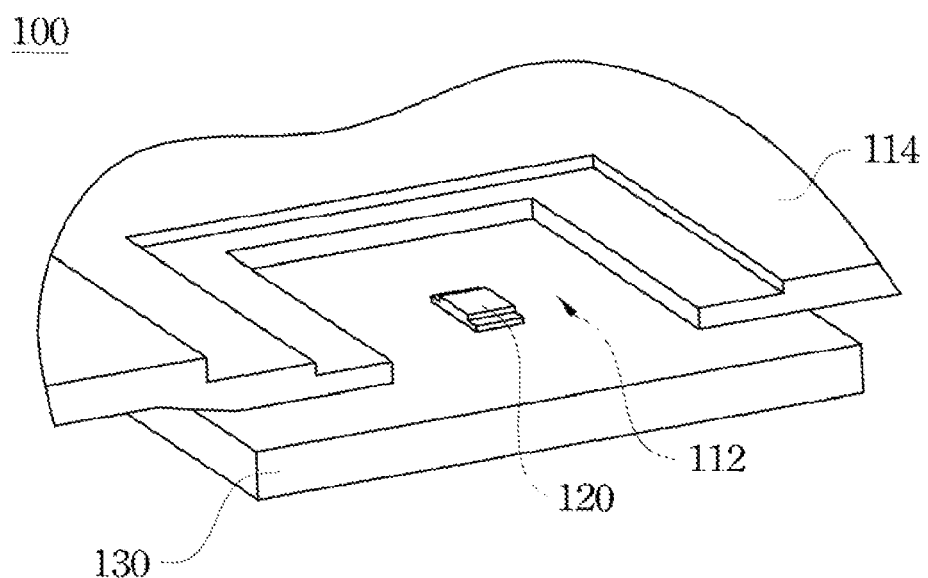
FIG. 1A is a three-dimensional cross-sectional view of an electronic device 100 of a first embodiment of the present invention.
Figure 1B:
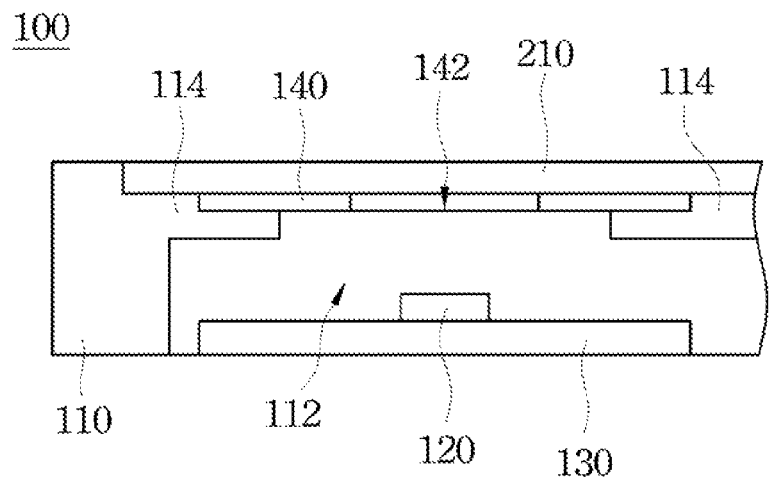
FIG. 1B is a front schematic cross-sectional view of the electronic device 100 shown in FIG. 1A.

FIG. 1A is a three-dimensional cross-sectional view of an electronic device 100 of a first embodiment of the present invention. FIG. 1B is a front schematic cross-sectional view of the electronic device 100 shown in FIG. 1A. As shown in FIG. 1A and FIG. 1B, the electronic device 100 includes a body 110, a light source 120, a light shutter 140, and a light transmissive net structure 210. The body 110 includes a cavity 112 therein. The light source 120 is disposed in the cavity 112. The light shutter 140 is disposed over the light source 120, wherein the light shutter 140 includes a light transmissive pattern 142 therein. The light transmissive net structure 210 is disposed over the cavity 112 and covers the light shutter 140. When the light source 120 is turned on, the light emitted from the light source 120 would pass through the light transmissive pattern 142 to the light transmissive net structure 210, thereby displaying an image corresponding to the light transmissive pattern 142 onto the light transmissive net structure 210.

In addition, the body 110 includes a top surface 114, wherein the top surface 114 means a portion of the body 110 over the cavity 112. A hole is formed on the top surface 114 under the light transmissive pattern 142, thereby allowing the light emitted from the light source 120 to pass through the top surface 114 onto the light transmissive pattern 142.

In this embodiment, the electronic device 100 includes a printed circuit board 130, wherein the printed circuit board 130 is disposed under the light source 120 and electrically connected with the light source 120. The printed circuit board 130 may use power or signals provided by other electronic apparatuses (not shown) to turn on or turn off the light source 120. For example, when users press a power button of a notebook, the light source 120 corresponding to the power-on light transmissive pattern 142 would be turned on, and then the light emitted from the light source 120 would be pass through the light transmissive pattern 142 to display an image corresponding to the light transmissive pattern 142 onto the light transmissive net structure 210.

The light source 120 mentioned above may be a light-emitting diode, the light transmissive net structure 210 may have a speaker net-like shape, and the light shutter 140 may be a polyester film (Mylar). Furthermore, the light shutter 140 and the light transmissive net structure 210 may be painted a same color. When the light source 120 is turned off, users cannot see the light shutter 140 under the light transmissive net structure 210 easily. Such arrangement has better effect on covering.

Figure 2:
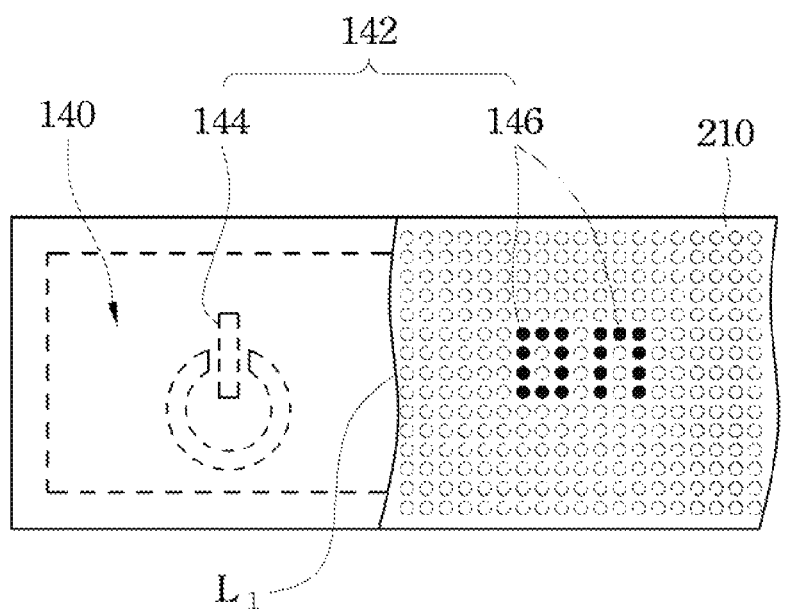
FIG. 2 is a top schematic view of the light shutter 140 shown in FIG. 1B.

FIG. 2 is a top schematic view of the light shutter 140 shown in FIG. 1B. As shown in FIG. 2, in order to illustrate this embodiment conveniently, the light transmissive net structure 210 is not shown on a left side of a curve L1, and the light transmissive net structure 210 covering the light shutter 140 is shown on a right side of the curve L1. The light shutter 140 includes the light transmissive pattern 142, wherein the light transmissive pattern 142 may be letters, symbols, or combinations thereof. In this embodiment, the light transmissive pattern 142 includes a symbol 144 and letters 146. The meaning of the light transmissive pattern 142 is "power on", so that the light source 120 (shown in FIG. 1B) corresponding to a signal "power on" is disposed under the light shutter 140. Practically, if the electronic device 100 is an indicator light of a notebook, after users press a power button of the notebook to power on the notebook, the light source 120 corresponding to the signal "power on" would be turned on, and then the light emitted from the light source 120 would pass through the light transmissive pattern 142 of the light shutter 140 to display the symbol 144 and the letters 146 onto the light transmissive net structure 210. In this way, users can see an image corresponding to the symbol 144 and the letters 146 displayed on the light transmissive net structure 210.

The symbol 144 and the letters 146 are displayed as grid-like patterns on the light transmissive net structure 210 because the light passes through the light transmissive net structure 210. Namely, the electronic device 100 can only use the light source 120 to reach the same performance as a light source array.

Figure 3:
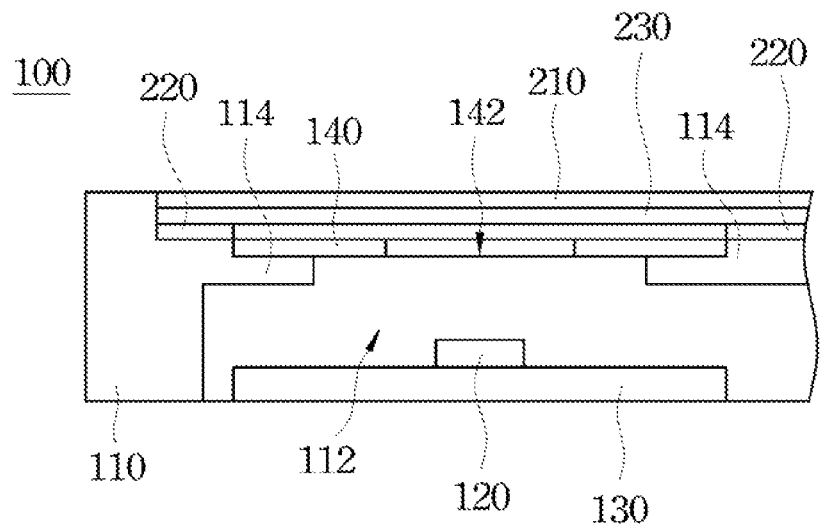
FIG. 3 is a front schematic cross-sectional view of an electronic device 100 of a second embodiment of the present invention.

FIG. 3 is a front schematic cross-sectional view of an electronic device 100 of a second embodiment of the present invention. As shown in FIG. 3, the electronic device 100 includes a dustproof net 230, wherein the dustproof net 230 is disposed between the light transmissive net structure 210 and the top surface 114 of the body 110. The dustproof net 230 may prevent dust from falling on the light shutter 140, so that a quality of a displayed image can be maintained. Furthermore, the dustproof net 230 is used for covering the light shutter 140 so as to increase the difficulty to see the light shutter 140 for users. In another embodiment, the dustproof net 230 is not necessary if the light transmissive net structure 210 has enough covering capability in accordance with practical requirements of designers. The electronic device 100 further includes an adhesive 220 for fastening the dustproof net 230 on the top surface 114 of the body 110, wherein the adhesive 220 includes a hollow area, and the light shutter 140 is positioned in the hollow area. As such, the adhesive 220 would not cover the light emitted from the light source 120 to the light transmissive net structure 210, and then an image corresponding to the light transmissive pattern 142 is displayed onto the light transmissive net structure 210.

Figure 4:
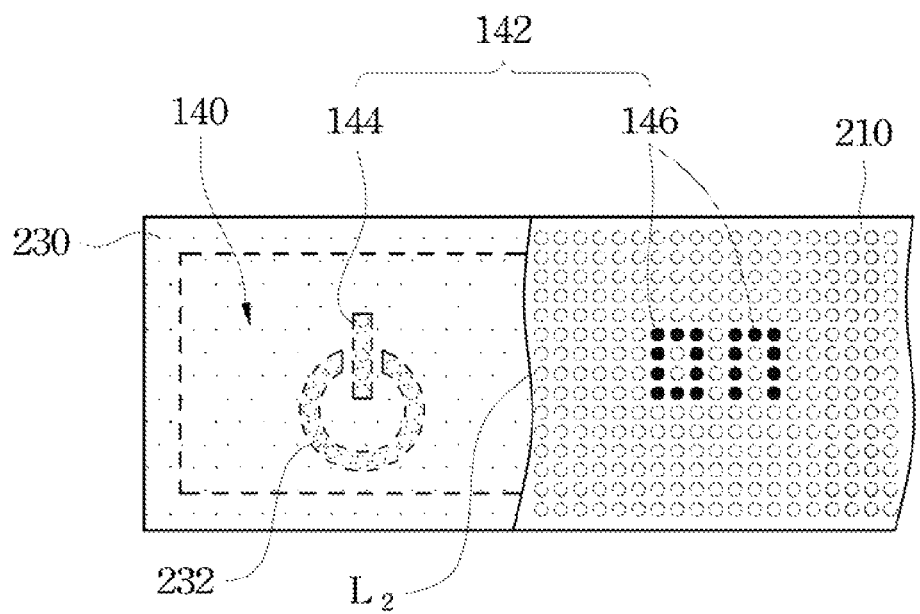
FIG. 4 is a top schematic view of the light shutter 140 shown in FIG. 3.

FIG. 4 is a top schematic view of the light shutter 140 shown in FIG. 3. As shown in FIG. 4, in order to illustrate this embodiment conveniently, the light transmissive net structure 210 is not shown on a left side of a curve L2, and the light transmissive net structure 210 covering the light shutter 140 is shown on a right side of a curve L2. The dustproof net 230 may be used in accordance with the covering capability of the light transmissive net structure 210. For example, if users can easily see the non-illuminated light shutter 140, the dustproof net 230 can be used for covering the light shutter 140. The dustproof net 230 is disposed between the light transmissive net structure 210 and the top surface 114 of the body 110 (shown in FIG. 3). However, the additional dustproof net 230 may cause the light cannot pass to display an image corresponding to the light transmissive pattern 142 onto the light transmissive net structure 210. Thus plural holes 232 corresponding to the symbol 144 and the letters 146 of the light transmissive pattern 142 formed on the dustproof net 230 are required. The light emitted from the light source 120 (shown in FIG. 3) under the light shutter 140 would pass through the holes 232 of the dustproof net 230 favorably to display the dotted symbol 144 and the dotted letters 146 onto the light transmissive net structure 210. Therefore users can see the symbol 144 and the letters 146 displayed on the light transmissive net structure 210 clearly. Such dustproof net 230 provides the covering capability when the light source 120 is turned off. Furthermore, after the light source 120 is turned on, the light would pass through the holes 232 formed on the dustproof net 230, thereby displaying an image corresponding to the light transmissive pattern 142 onto the light transmissive net structure 210 in spite of disposing the additional dustproof net 230 under the light transmissive net structure 210.

Figure 5A:
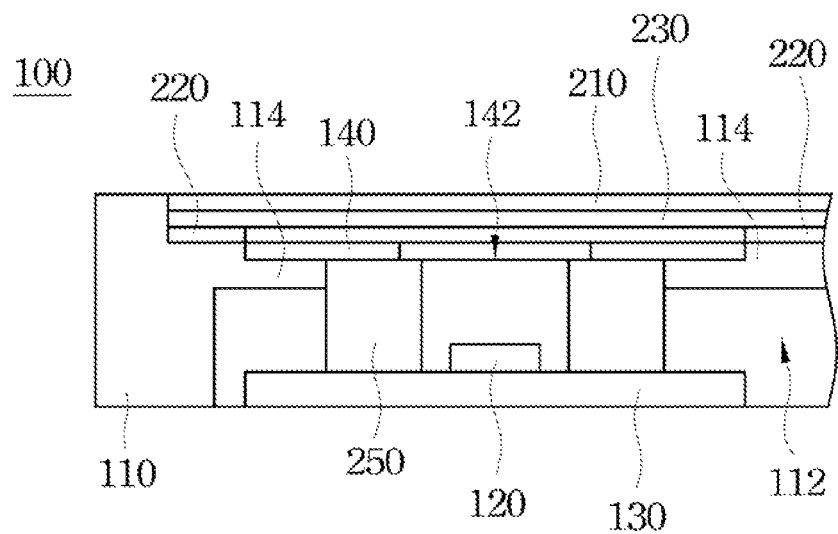
FIG. 5A is a front schematic cross-sectional view of an electronic device 100 of a third embodiment of the present invention.

FIG. 5A is a front schematic cross-sectional view of an electronic device 100 of a third embodiment of the present invention. As shown in FIG. 5A, a shading structure 250 is disposed between the printed circuit board 130 and the light shutter 140 of the electronic device 100, wherein the shading structure 250 may be a high-density sponge with black color. The shading structure 250 may be painted a dark color (e.g. black color), so that the shading structure 250 would prevent the light leakage. Namely, the light emitted from the light source 120 would focus on the light transmissive pattern 142 to display a clearer image onto the light transmissive net structure 210.

Shapes of the body 110 and the shading structure 250 may be formed in accordance with practical requirements of designers, and the body 110 and the shading structure 250 can be cooperated with each other. For example, when a supporting area between an edge of the light shutter 140 and the top surface 114 of the body 110 is not enough, a sag region may be formed at a center of the light shutter 140 to deform the light transmissive pattern 142 of the light shutter 140, so that an displayed image corresponding to the light transmissive pattern 142 on the light transmissive net structure 210 may also be deformed. Therefore the shading structure 250 may be disposed between the printed circuit board 130 and the light shutter 140 to support the light shutter 140.

Figure 5B:
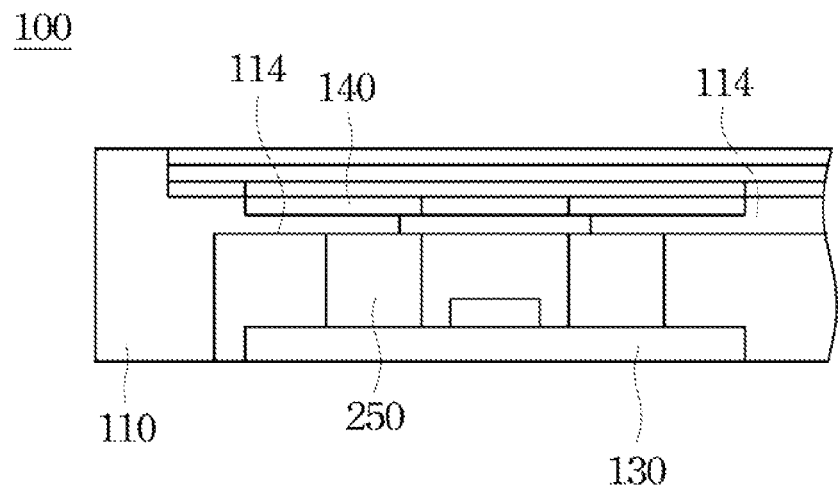
FIG. 5B is a front schematic cross-sectional view of an electronic device 100 of a fourth embodiment of the present invention.

FIG. 5B is a front schematic cross-sectional view of an electronic device 100 of a fourth embodiment of the present invention. When a supporting area between an edge of the light shutter 140 and the top surface 114 of the body 110 is enough, no sag region would be formed at a center of the light shutter 140, and the shading structure 250 may be disposed between the printed circuit board 130 and the top surface 114.

Figure 6:
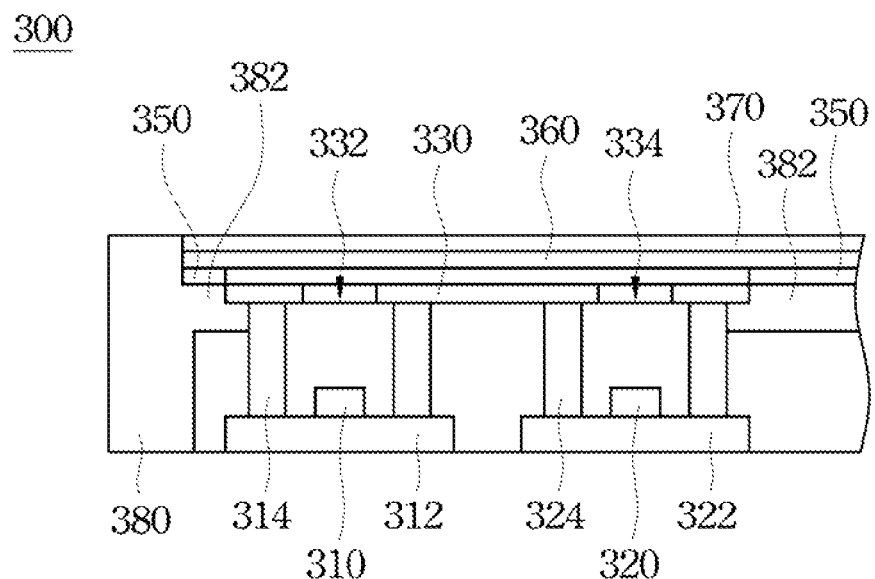
FIG. 6 is a front schematic cross-sectional view of an electronic device 300 of a fifth embodiment of the present invention.

FIG. 6 is a front schematic cross-sectional view of an electronic device 300 of a fifth embodiment of the present invention. As shown in FIG. 6, the electronic device 300 includes a body 380, a light source 310, a light source 320, a shading structure 314, a shading structure 324, a light shutter 330, a dustproof net 360, and a light transmissive net structure 370, wherein the light shutter 330 may be a single sheet having a first light transmissive pattern 332 and a second light transmissive pattern 334, and the first light transmissive pattern 332 and the second light transmissive pattern 334 have different meanings. The first light transmissive pattern 332 and the second light transmissive pattern 334 are disposed over the light source 310 and the light source 320 respectively. Alternately, the light shutter 330 may include two individual sheets, such as one sheet of the light shutter 330 has the first light transmissive pattern 332, and another sheet of the light shutter 330 has the second light transmissive pattern 334. Such design can also reach the same light transmissive performance as the single sheet in accordance with practical requirements of designers. As the above mentioned, an adhesive 350 is used for fastening the dustproof net 360 on a top surface 382, wherein the adhesive 350 is disposed between an underside of the dustproof net 360 and the top surface 382 of the body 380.

Furthermore, some elements mentioned above are not necessary to be disposed in accordance with practical requirements of designers, such as the dustproof net 360, the adhesive 350, and the shading structure 314/324.

Figure 7:
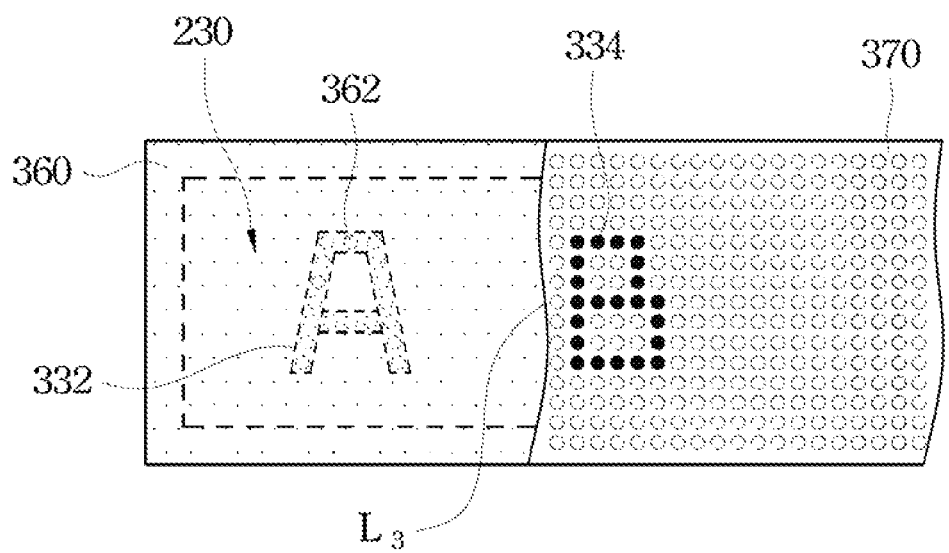
FIG. 7 is a top schematic view of the light shutter 330 shown in FIG. 6.

FIG. 7 is a top schematic view of the light shutter 330 shown in FIG. 6. As shown in FIG. 7, in order to illustrate this embodiment conveniently, the light transmissive net structure 370 is not shown on a left side of a curve L3, and the light transmissive net structure 370 covering the light shutter 330 is shown on a right side of a curve L3. As shown in FIG. 6 and FIG. 7, the light shutter 330 includes the first light transmissive pattern 332 and the second light transmissive pattern 334, wherein the first light transmissive pattern 332 means the external apparatus (not shown) is driven by AC power, and the second light transmissive pattern 334 means the external apparatus is driven by battery power. When the light source 310 and light source 320 are both turned off, i.e. the external apparatus is powered off, users cannot see the first light transmissive pattern 332 and the second light transmissive pattern 334 because the dustproof net 360 and the light transmissive net structure 370 cover the light shutter 330.

After the apparatus is powered on with AC power, because the light source 310 and the light source 320 are controlled by the printed circuit board 312 and the printed circuit board 322 respectively, only the light source 310 corresponding to an AC power signal would be turned on, so that users can see an image corresponding to the first light transmissive pattern 332 displayed on the light transmissive net structure 370. However, an image corresponding to the second light transmissive pattern 334 would not be displayed. Furthermore, when the apparatus is powered on with battery power, only the light source 320 corresponding to the battery power signal would be turned on, so that users can see an image corresponding to the second light transmissive pattern 334 displayed on the light transmissive net structure 370, but an image corresponding to the first light transmissive pattern 332 would not be displayed.

The embodiments mentioned above of the present invention compared with conventional structures have some advantages described below:

(1) When the light source is turned off, users cannot see the light transmissive pattern of the light shutter because of the light transmissive net structure covering the light shutter, therefore users can only see the light transmissive net structure. Such arrangement provides an appearance with concise style for users. When the light source is turned on, users can only see an image corresponding to the light transmissive pattern disposed over the light source displayed on the light transmissive net structure. So that users do not suffer visual disturbance from other non-illuminated patterns, thereby judging the meaning of the pattern displayed on the light transmissive net structure more correctly and easily.

(2) The shading structure may be designed with a dark color (e.g. black color), so that the shading structure can prevent the light leakage. Namely, the light emitted from the light source would focus on the light transmissive pattern to display a clearer image onto the light transmissive net structure.

(3) The shading structure may be disposed between the printed circuit board and the light shutter or between the printed circuit board and the top surface of the body in accordance with states of the light shutter supported by the body. Therefore the light shutter can be supported by the shading structure when the shading structure is disposed between the circuit boar and the light shutter.

(4) Such electronic device does not need light guide plates disposed over light sources so as to decrease the cost of materials and assembly of light guide plates.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An electronic device comprising:
a body comprising a cavity therein;
a light source disposed in the cavity;
a light shutter disposed over the light source, wherein the light shutter comprises a light transmissive pattern therein;
a light transmissive net structure disposed over the cavity and covering the light shutter, wherein light emitted from the light source passes through the light transmissive pattern to the light transmissive net structure, thereby displaying an image corresponding to the light transmissive pattern onto the light transmissive net structure;
a printed circuit board disposed under the light source and electrically connected with the light source;

a shading structure disposed between the printed circuit board and the light shutter or between the printed circuit board and a top surface of the body, wherein the light source is disposed within the shading structure;

a dustproof net disposed between the light transmissive net structure and the top surface of the body, wherein the dustproof net comprises a plurality of holes therein to allow the light to pass through the dustproof net; and an adhesive for fastening the dustproof net on the top surface of the body, wherein the adhesive comprises a hollow area, and the light shutter is position in the hollow area.

2. The electronic device as claimed in claim 1, wherein the shading structure is made of a sponge.

3. The electronic device as claimed in claim 1, wherein the light shutter is a polyester film.

4. The electronic device as claimed in claim 1, wherein the light source is a light-emitting diode.

* * * * *